United States Patent [19]

Dodgen et al.

[11] 4,441,077

[45] Apr. 3, 1984

[54] REAL TIME EDDY CURRENT RESPONSIVE HALL EFFECT DEVICE TACHOMETER

[75] Inventors: David F. Dodgen, Boca Raton; Ludwig R. Siegl, Highland Beach, both of Fla.

[73] Assignee: International Business Machines, Armonk, N.Y.

[21] Appl. No.: 323,778

[22] Filed: Nov. 23, 1981

[51] Int. Cl.³ ............................ G01D 3/48; G01D 3/54
[52] U.S. Cl. ....................................... 324/164; 73/519
[58] Field of Search ............... 324/164, 166, 208, 239; 73/519, 520, 497

[56] References Cited

U.S. PATENT DOCUMENTS

| 3,932,813 | 1/1976 | Gallant | 324/164 |
|---|---|---|---|
| 4,011,476 | 3/1977 | Beard | 310/70 R |
| 4,093,917 | 6/1978 | Haeussermann | 324/173 |

FOREIGN PATENT DOCUMENTS

| 1147787 | 4/1963 | Fed. Rep. of Germany | 324/164 |
|---|---|---|---|
| 1209780 | 1/1966 | Fed. Rep. of Germany | 324/164 |
| 1266033 | 4/1968 | Fed. Rep. of Germany | 324/164 |

OTHER PUBLICATIONS

G. M. Berkin, "Magnetic Tachometer", IBM Technical Disclosure Bulletin, vol. 3, No. 3, Aug. 1960, p. 74.
D. E. Cuzner et al., "Shaft Speed Detector", IBM Technical Disclosure Bulletin, vol. 11, No. 3, Aug. 1968, p. 347.
A. B. Wills, "Magnetic Tachometer", IBM Technical Disclosure Bulletin, vol. 16, No. 1, Jun. 1973, p. 260.

*Primary Examiner*—Stanley T. Krawczewicz
*Assistant Examiner*—Jose M. Solis
*Attorney, Agent, or Firm*—R. E. Cummins; G. E. Roush

[57] ABSTRACT

A real time tachometer is realized in an electromechanical device having a moving member, for example a disk, of nonmagnetic electrically conductive material driven by a suitable moving device, for example a rotating shaft, the velocity of which is to be determined. An assembly of at least one permanent magnet and at least one Hall effect device is arranged for inducing eddy currents in the moving member or rotating disk and measuring them for indicating the relative velocity. The placement and electric interconnection of the Hall effect devices measure the magnetic field provided by the magnet and in an alternate embodiment incorporate compensation for runout and adverse deflection with a rotating disk.

2 Claims, 9 Drawing Figures

REAL TIME EDDY CURRENT RESPONSIVE HALL EFFECT DEVICE TACHOMETER

FIELD

The invention relates to tachometers, and it particularly pertains to real time tachometer mechanisms responsive to eddy currents sensed by Hall effect devices.

BACKGROUND

Mechanical tachometer mechanisms have been used for nearly a century and eddy current mechanisms have not been far behind. The automobile speedometer is an example of coarse speed indicating devices which have been made in many forms. Another type of tachometer, the brush type motor generator, is an example requiring expensive precision wound coils and suffering from ripple due to coil commutation. Electronic tachometers are excellent for some applications but require time for counting or pulse integrating. Optical encoding types require time for averaging signals resulting in time delays which may lead to instability in feedback systems. Thus, there is a need for a precision real time tachometer of simple, inexpensive construction having a linear indication of rotational velocity free from ripple.

SUMMARY

The objects of the invention indirectly referred to hereinbefore and those that will appear as the specification progresses are attained in a simple electromechanical device having a moving member, for example a disk, of nonmagnetic electrically conductive material driven by a suitable moving device, for example a rotating shaft, the velocity of which is to be determined and an assembly of at least one permanent magnet and at least one Hall effect device for inducing eddy currents in the moving member or rotating disk and measuring them for indicating the relative velocity. The placement and electric interconnection of the Hall effect devices avail of the magnetic field provided by the magnet and in an alternate embodiment enable compensation for runout and adverse deflection with a rotating disk.

PRIOR ART

There is pertinent prior art to be found in the following U.S. Pat. Nos.:

| | | | |
|---|---|---|---|
| 3,932,813 | 1/1976 | Gallant | 324/164 |
| 4,011,476 | 3/1977 | Beard | 310/70R |
| 4,093,917 | 6/1978 | Haeussermann | 324/173 |

And in the published literature:
- G. M. Berkin; "Magnetic Tachometer"; IBM Technical Disclosure Bulletin, Vol. 3, No. 3, August 1960; p. 74.
- D. E. Cuzner, A. Paton, and C. N. Wallis; "Shaft Speed Detector"; IBM Technical Disclosure Bulletin, Vol. 11, No. 3, August 1968; p. 347.
- A. B. Wills; "Magnetic Tachometer"; IBM Technical Disclosure Bulletin, Vol. 16, No. 1, June 1973; p. 260.

The patent to Gallant is directed to a sensor for detecting eddy currents in an arrangement wherein the rotational velocity of an aircraft turbine engine is determined. Two sensing windings are provided and connected differentially whereby random noise and other stray potentials are eliminated from the output current.

The patent to Beard is directed to a generator of current having a frequency indicative of the rotating shaft of an internal combustion engine. The distributor of the engine ignition system is fitted with non-magnetic vanes and a Hall effect device together with auxiliary circuitry for generating pulsating dc current proportional to the angular velocity of the shaft of the distributor.

Haeusserman, in his patent, discloses a velocity sensing arrangement having two Hall effect devices connected differentially for indicating the velocity of a moving conductive body subjected to a magnetic field from an E-shaped core on which the Hall effect devices are mounted for detecting eddy current changes in the moving conductive body.

The publication of Berkin is directed to the basics of differential sensing of eddy current in a simple tachometer arrangement having a pair of differentially connected windings.

The publication of Cuzner, Paton and Wallis is directed to an arrangement for detecting a single speed of rotation of an aluminum disk by sensing the effect of velocity on a magnetic field set up about a portion of the disk, and using a soft iron yoke holding a reed-switch capsule which is electrically closed at a predetermined magnetic field threshold.

Wills, in his publication, describes an arrangement requiring a magnetic disk and a Hall effect device for measuring the rotational velocity of the disk in a simple manner.

The combinations of components according to the invention are absent from the several arrangements described in these prior art references. Particularly, there is no suggestion of a yoke structure placing permanent magnetic and Hall effect devices in air gaps between members of the assembly for inducing eddy currents in the disk and providing a magnetic field for the Hall effect devices which respond to the variations in eddy currents to indicate the speed of rotation of the disk. More particularly there is no suggestion of arranging pairs of Hall effect devices on either side of the disk for balancing out adverse effects of runout.

BRIEF DESCRIPTION OF THE DRAWINGS

In order that all of the advantages of the invention obtain in practice, the best mode embodiment thereof, given by way of example only, is described in detail hereinafter, with reference to the accompanying drawings, forming a part of the specification, and in which.

DESCRIPTION

Figure 1A:
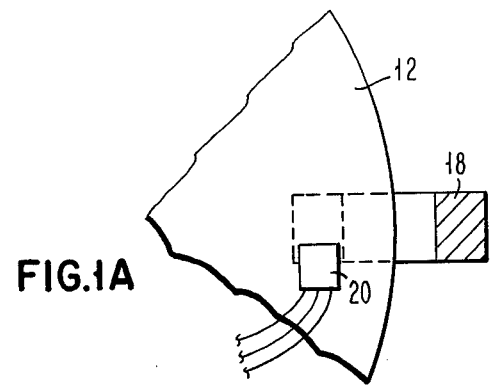
FIG. 1A is a cross-section view of part of the structure shown in FIG. 1 taken along the line A—A.
Figure 1:
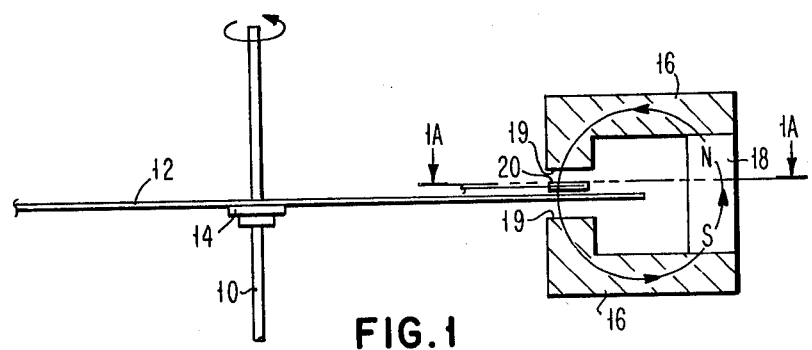
FIG. 1 is a schematic diagram of a basic tachometer arrangement according to the invention.

A basic arrangement according to the invention is shown schematically in FIG. 1. A rotating shaft 10 bears member in the form of a flat circular disk 12 of electrically conducting nonmagnetic material, preferably aluminum, fixed to the shaft by means of a hub 14 for determining the rotational velocity of the shaft 10. The arrangement also comprises two core members 16,16 of magnetic field concentrating material, preferably soft iron; a permanent magnet 18, preferably a bar magnet as shown but which may be a large C-shaped magnet as suggested, with added pole pieces 19,19; and a Hall effect device 20, all preferably assembled in a yoke that provides an air gap between the faces 19,19 of the core members 16,16. This yoke is then arranged about the disk 12 and the Hall effect device 20 in the air gap as shown.

Figure 2:
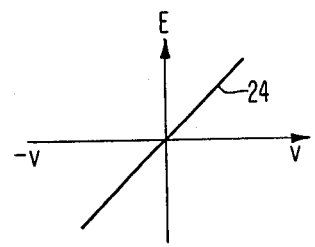
FIG. 2 is a graphical representation of the output potential with respect to the shaft rotational velocity of the basic arrangement.

The Hall effect device 20 senses the magnetic field that exists in the magnetic circuit and provides a linear output potential proportional to the strength of the magnetic field. When the aluminum disk is stationary the magnetic flux generated by the permanent magnet is at its nominal density. The Hall effect device would indicate the presence of the static level field. As the aluminum disk rotates, the magnetic field that exists across the air gap, causes eddy current to flow in the disk. Depending on the direction of rotation, the eddy current in turn generates a magnetic field, opposing or aiding the static one at the edge of the pole faces 19,19. The magnetic flux in the magnetic circuit is therefore reduced or enhanced. The change in flux density is sensed by the linear Hall device 20, indicating the disk movement. As disk rotational velocity increases, the magnetic field in the circuit is reduced or increased proportionally. The relationship between the disk velocity and the magnetic flux density is linear, and therefore permits tachometer design. The Hall device output is a potential. Therefore, a real time conversion of velocity to voltage is in order. Since no commutation is involved, no source of ripple exists. A graphical representation of the output potential E with reference to rotational velocity V is shown in FIG. 2 by a curve 24.

Figure 3:
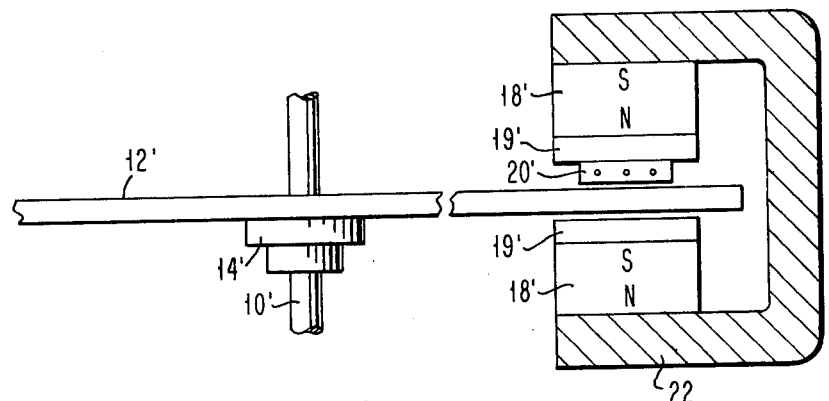
FIG. 3 is a diagram of a practical embodiment of a tachometer according to the invention.

One practical embodiment of a real time eddy current responsive Hall effect device tachometer is diagrammed in FIG. 3. A C-shaped yoke 22 has a pair of permanent magnets 18' having pole faces 19' is arranged with the aluminum, copper or magnesium disk 12' and two Hall effect devices 20' (one of which is hidden behind the other) arranged in the air gap between pole faces 19'.

Figure 4:
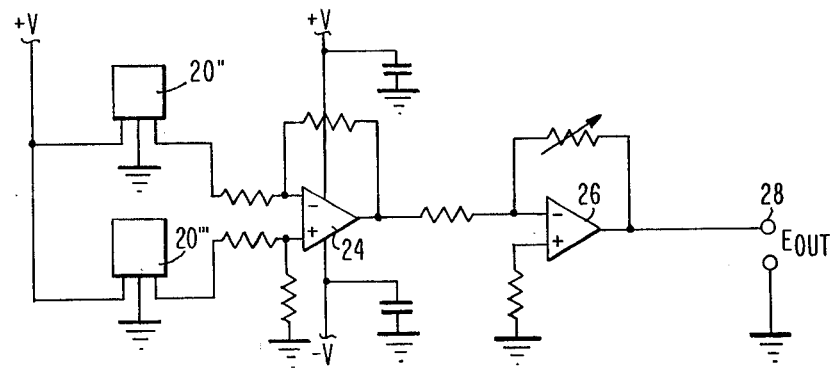
FIG. 4 is a functional electric circuit diagram of a tachometer according to the invention.

The Hall effect devices 20' sense the magnetic field that exists in the air gap and provide an output potential proportional to the strength of the magnetic field. Two devices 20'' and 20''' used in FIG. 4, with their outputs connected to a differential amplifier 24 as shown, provide zero net output for a motionless disk.

Figure 5:
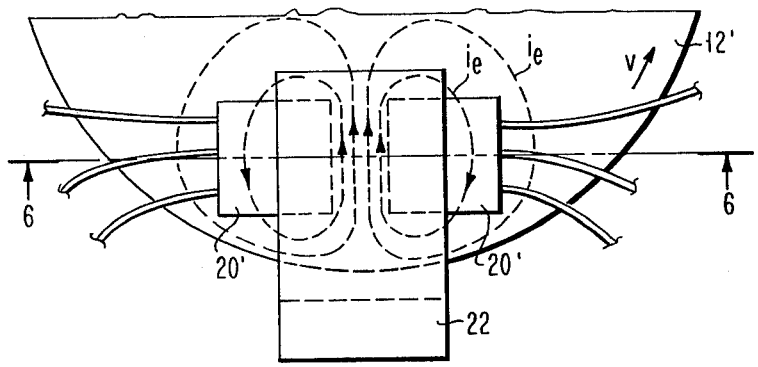
FIGS. 5 and 6 are diagrams depicting magnetic fields and eddy currents in the tachometer arrangement as diagrammed in FIG. 3.
Figure 6:
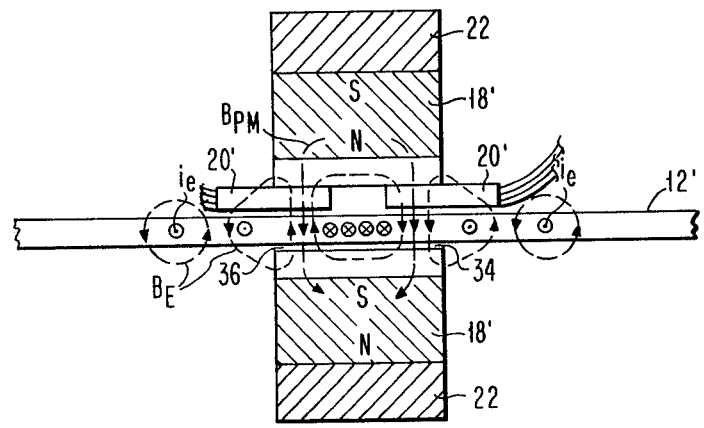

FIGS. 5 and 6 are diagrams showing the effect of rotating an electrically conductive disk 12' (for example, aluminum, magnesium or copper) in the presence of a constant magnetic field supplied by the permanent magnets 18',18' above and below the Hall effect devices 20',20'. (The magnets are hidden in the yoke 22 in FIG. 5.)

Moving the disk 12' in the presence of a magnetic induces potential in the disk 12. The free electrons in the metal now produce eddy currents within the disk. The paths of the eddy currents are indicated by the dashed lines $i_e$; the magnetic flux of the permanent magnets by the dashed lines $B_{PM}$; and the magnetic flux produced by the eddy currents by dashed lines $B_E$.

If the disk 12' is standing still, no eddy current is induced in the disk and $B_E$ equals zero; the Hall effect devices are subjected to equal magnetic fields from the permanent magnets 18',18' and the output potential $E_{out}$ is zero. With the disk 12' spinning, eddy currents and their fluxes are created as shown in FIGS. 5 and 6. In the air gap 34 the fluxes $B_{PM}$ and $B_E$ from the permanent magnets add, whereas, the two fluxes are in opposition in the air gap 36. This results in an output potential of given polarity. If the rotation of the disk is reversed, the direction of the eddy currents change and with it the polarity of the output potential. The magnitude of the output potential is proportional to the speed and direction of rotation as represented by a curve similar to the curve 24 in FIG. 2.

The output potential of the basic eddy current tachometer is dependent on the physical distance of the rotating disk to the Hall effect devices. Any variation of this distance due to run out (wobbling) will modulate the output potential.

Figure 7:
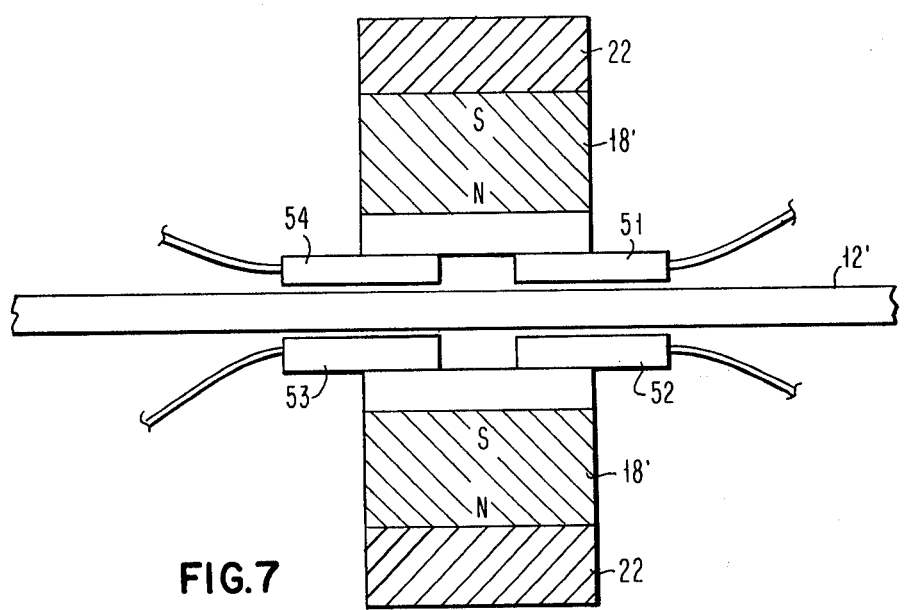
FIG. 7 is a diagram of an alternate embodiment of a tachometer arrangement according to the invention.
Figure 8:
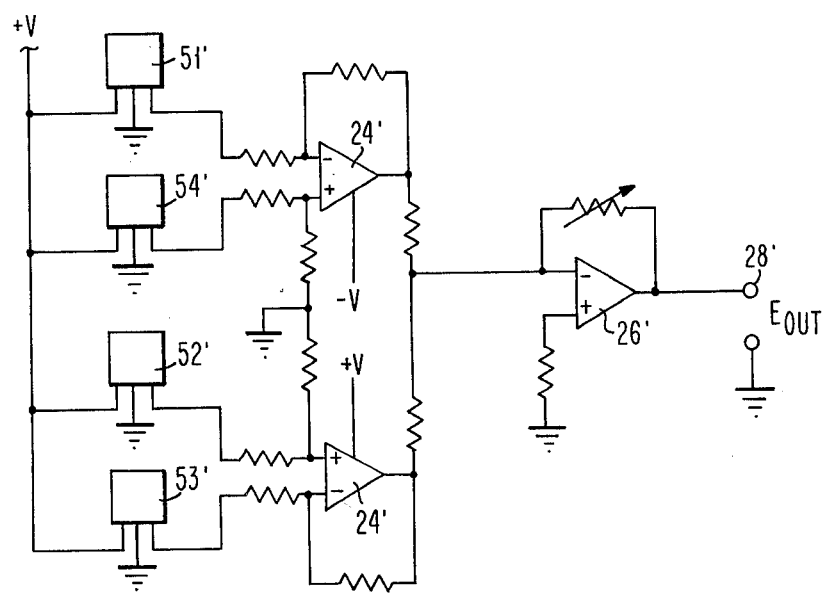
FIG. 8 is a functional electric circuit diagram of a tachometer in accordance with the diagrammed embodiment shown in FIG. 7.

FIG. 7 is a diagram showing an improved version of this tachometer according to the invention. If, for instance, the distance between the disk 12' and the Hall effect device 51 increases, the distance between the disk and the Hall device 52 decreases. If the output potentials of the Hall effect devices 51 and 52, as well as 53 and 54, are added by connecting in a circuit arrangement as shown in FIG. 8, the sensitivity to run out is greatly reduced. Assuming the same flux from each permanent magnet, the output potential is also doubled.

It should clearly be understood that while the invention has been described in terms of rotating disks, it is equally applicable to devices having linear motion characteristics, that is to disks of infinite radii as it were.

The resulting tachometer is a linear, real time, bipolar velocity-to-potential converter. Its simplicity lends itself to high reliability, with minimum mechanical restraints in fabrication, and resulting low cost. It is a further advantage that neither ripple nor information time lag is encountered.

While the invention has been described in terms of a preferred embodiment, and changes and variations have been suggested, it should be clearly understood that those skilled in the art will make further changes in their applications without departing from the spirit and scope of the invention as defined in the appended claims concluding the specification.

The invention claimed is:

1. A tachometer for providing an analog electrical voltage signal whose amplitude indicates in real time the velocity of a flat, moving, nonmagnetic, electrically conductive member and whose polarity indicates the direction of movement of said member comprising in combination:
   (1) a pair of permanent magnets and a C-shaped yoke of material for providing a magnetic circuit including an air gap defined by first and second opposed parallel pole faces corresponding to opposite poles of said pair of permanent magnets;
   (2) means for moving said member through said air gap in a plane parallel to said faces so as to induce eddy currents in the surface of said flat member which flow generally in closed loop paths that include parallel segments disposed substantially normal to the direction of movement of said member, said eddy currents causing an eddy current flux field which at the mid-point of said air gap includes lines of induced eddy current flux which are substantially parallel to the lines of permanent magnetic flux in said air gap, said induced eddy current lines of flux disposed on opposite sides of said mid-point of said air gap being in opposite directions whereby the net value of flux at any point in said air gap varies as a function of (a) the velocity of said member; (b) the location of said point relative to said center point; and (c) the distance of said member from each of said parallel faces corresponding to said pole faces;

(3) a first pair of Hall effect sensing devices positioned between said moving member and one said pole face and disposed in spaced apart relationship relative to each other on opposite sides of said mid-point;

(4) a second pair of Hall effect sensing devices positioned between said moving member and said other pole face and disposed in correspondingly spaced apart relationship on opposite sides of said mid-point; and (5) circuit means for (a) first, differentially combining the outputs of said Hall effect sensing device of each pair to provide potential output signals which are indicative of the velocity and direction of movement of said member, and (b) secondly, differentially combining said potential signals from said first and second pair of Hall effect devices to eliminate errors in said indication of velocity resulting from any wobble type movement of said member in said air gap in a direction parallel to said flux lines.

2. The combination recited in claim 1 in which said member is a circular disk mounted on a shaft for rotation about an axis normal to said disk surface and spaced from said magnetic circuit whereby said potential signals reflect the rotational velocity of said shaft and its direction.

* * * * *